United States Patent [19]
Gonda et al.

[11] Patent Number: 5,471,954
[45] Date of Patent: Dec. 5, 1995

[54] ANIMAL TRAINING ELECTRODE STRUCTURE INCLUDING INTEGRAL RESISTIVE ELEMENT

[75] Inventors: Gerald J. Gonda, Vail; Gregory J. Farkas, Tucson, both of Ariz.

[73] Assignee: Tri-Tronics, Inc., Tucson, Ariz.

[21] Appl. No.: 279,924

[22] Filed: Jul. 25, 1994

[51] Int. Cl.⁶ .................................................. A01K 29/00
[52] U.S. Cl. .................................. 119/859; 119/908
[58] Field of Search .............................. 119/720, 721, 119/859, 908

[56] References Cited

U.S. PATENT DOCUMENTS

| | | | |
|---|---|---|---|
| 2,441,812 | 5/1948 | Haffner | 231/2 |
| 3,119,554 | 1/1964 | Fagan et al. | 231/2 |
| 3,161,005 | 12/1964 | Ackerson | 54/71 |
| 3,484,665 | 12/1969 | Mountjoy et al. | 317/262 |
| 3,589,337 | 6/1971 | Doss | 119/859 X |
| 3,777,712 | 12/1973 | Gardner et al. | 119/29 |
| 3,874,339 | 4/1975 | Coulbourn | 119/29 |
| 3,998,459 | 12/1976 | Henderson et al. | 273/84 |
| 4,200,809 | 4/1980 | Madsen et al. | 307/132 |
| 4,394,956 | 7/1983 | Andrews et al. | 231/2 E |
| 4,424,932 | 1/1984 | Allen | 231/2 E |
| 4,667,431 | 5/1987 | Mendicino | 43/6 |
| 4,872,084 | 10/1989 | Dunning et al. | 361/232 |
| 5,099,797 | 3/1992 | Gonda | 119/29 |
| 5,193,484 | 3/1993 | Gonda | 119/29 |
| 5,207,178 | 5/1993 | McDade et al. | 119/859 |
| 5,408,956 | 4/1995 | Quigley | 119/720 |

*Primary Examiner*—Robert P. Swiatek
*Attorney, Agent, or Firm*—Cahill, Sutton & Thomas

[57] ABSTRACT

A resistive electrode structure for an electronic stimulus collar includes a base attached to a connecting element of the electronic stimulus collar. An electrode of the resistive electrode structure includes a tip adapted to supply electrical stimulus to the skin of an animal. A resistive material is electrically connected between a conductor for electrical connection to an output of the electronic stimulus collar and the electrode. An insulative housing encloses the resistive material and supports the electrode and the conductor. Various such resistive electrode structures having various resistances can be interchangeably connected to the electronic stimulus collar to vary the level of stimulus applied to the skin of the animal.

21 Claims, 3 Drawing Sheets

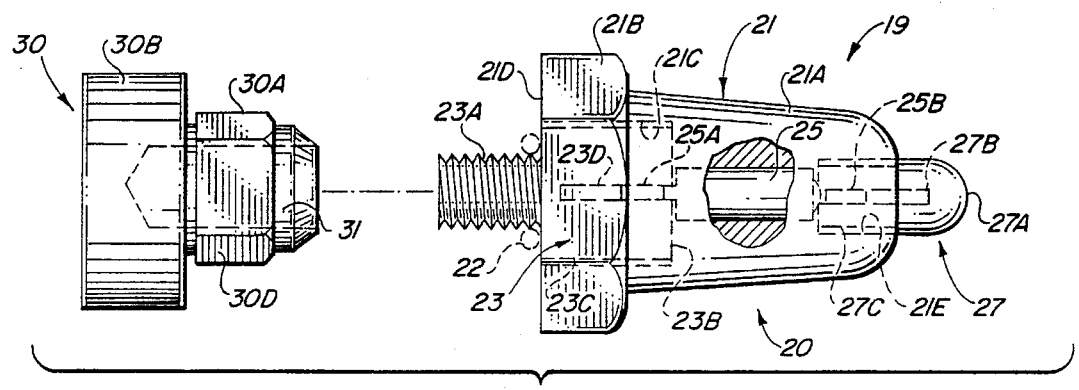
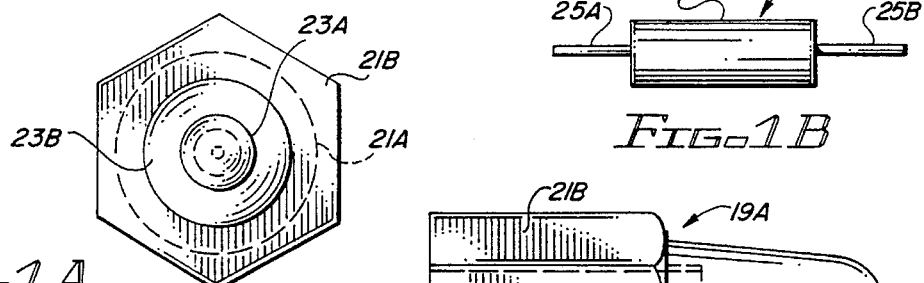
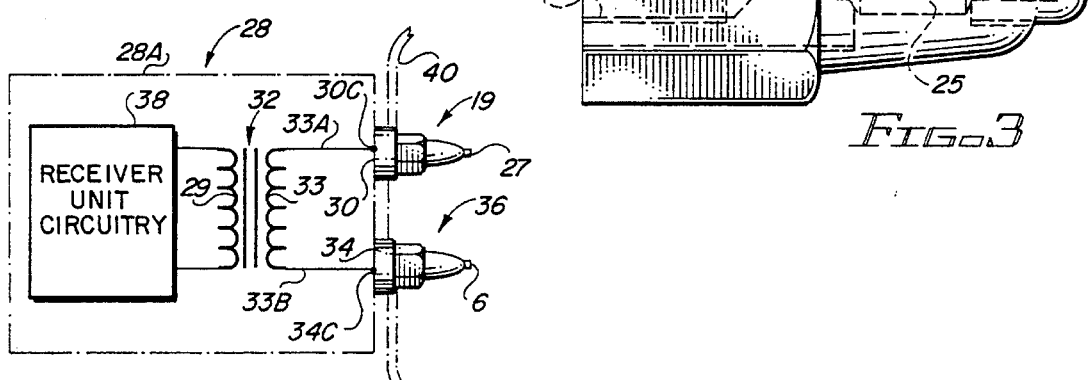
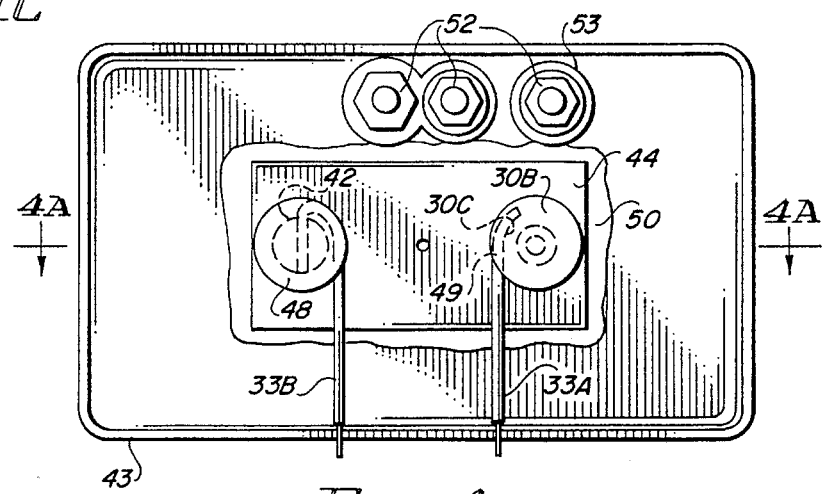

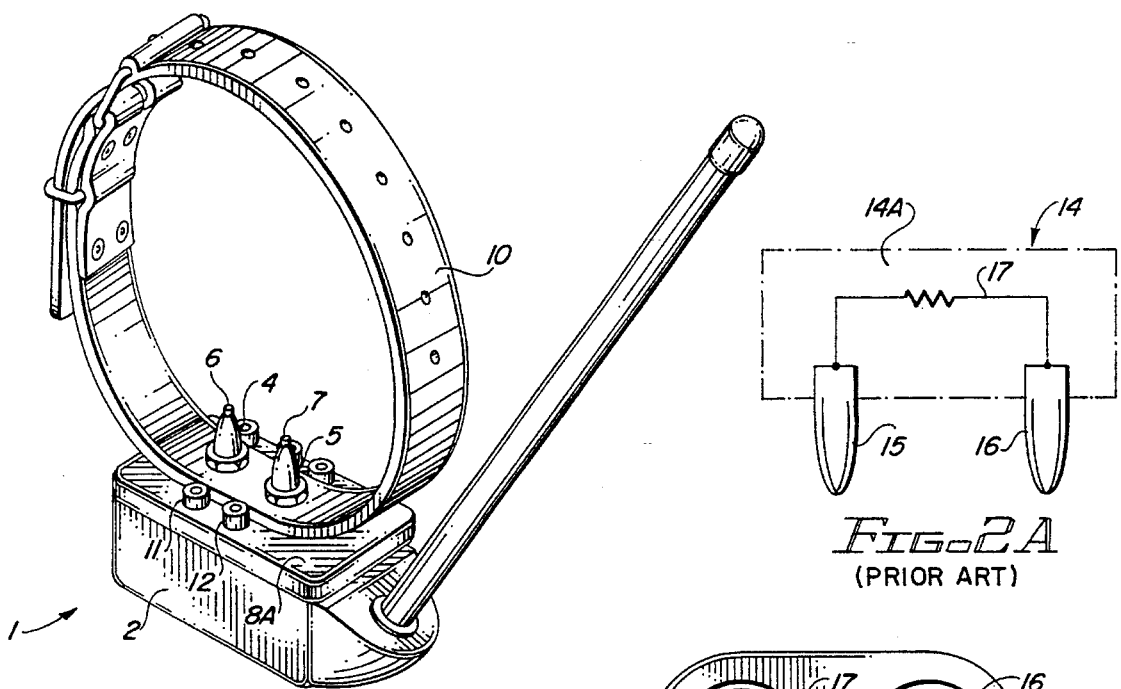
FIG-2
(PRIOR ART)
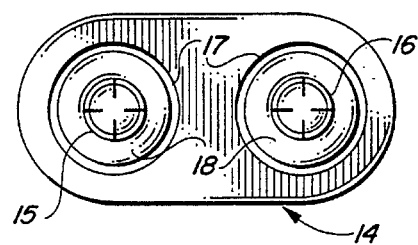
FIG-2A
(PRIOR ART)
FIG-2B
(PRIOR ART)
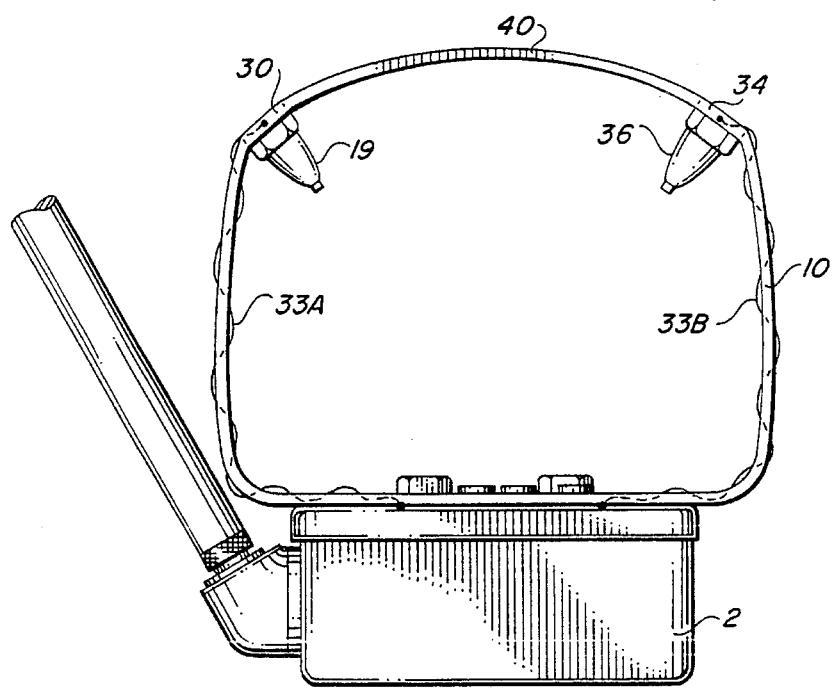
FIG-5

ANIMAL TRAINING ELECTRODE STRUCTURE INCLUDING INTEGRAL RESISTIVE ELEMENT

BACKGROUND OF THE INVENTION

The invention relates to apparatus for applying and controlling electrical stimulus to accomplish aversive/motivational conditioning/training of animals.

The state of the art in the use of electronic stimulus collars for dog training is comprehensively set forth in "Retriever Training", by Jim and Phyllis Dobbs and Alice Woodyard, 1993, "Understanding Electronic Dog-Training" by Dr. Daniel F. Tortora, 1982, and "Teaching Dogs the Skill of Silence", 1985, all published by the present assignee Tri-Tronics, Inc. The state of the art also is indicated in "Three-Action Introduction" published by Tri-Tronics, Inc., 1993 and "Solving Dog Behavior Problems with The Tri-Tronics Remote Trainer" published by Tri-Tronics, 1992, and U.S. Pat. Nos. 5,193,484 and 4,802,482, both owned by the present assignee. Upon information and belief, one defunct company, Ability Center, Inc. of Tucson, Ariz., has used an external resistor encapsulated between two washer-like metal surfaces mounted under and in series connection with one of the two usual electrodes of an electronic stimulus collar. We are aware of no prior electrical stimulus training devices that have included a stimulation current limiting resistor as an integral part of an electrode structure.

Various electronic stimulus collars, such as Tri-Tronics models 100, 200, 300 and 500, are commonly used for training dogs. Mostly as a result of efforts by Tri-Tronics, Inc. during the past ten to fifteen years, humane societies throughout the United States have come to recognize that proper use of such electronic collars is a very effective, efficient, and humane way to train or control dogs for a variety of purposes, such as general obedience, performance trials, hunting, herding, and police work. Electronic collars also have been used in "invisible fence" dog containment systems. To be most effective and humane, it is essential that electronic stimulus collars be able to reliably and consistently apply the intended degree of stimulus to the skins of a wide variety of dogs under a wide variety of conditions. (Although dogs are mentioned in most examples herein and in the above patents, it is recognized that electronic stimulus collars and the like also are effective in the training of other animals such as monkeys, horses, etc.)

Accomplishment of the foregoing is complicated by the fact that various dogs have greatly varying lengths and thicknesses of fur. Furthermore, their skin and fur conditions can range from very dry (since dogs do not perspire) and electrically nonconductive to very wet and highly conductive. The fur of a dog running through wet brush or jumping into a pond or creek, for example, during retrieval training, may be electrically nonconductive during the early part of a training procedure and very conductive during a later part thereof. Furthermore, some dogs may be very sensitive to electrical stimulation and require only a low level of aversive or motivational stimulation, while other dogs (especially if they are in a highly distracted state, for example, because they see another dog, a cat, rabbit, etc.) may be insensitive to or oblivious even to quite high levels of stimulation.

It should be helpful to now refer to FIGS. 2, 2A, and 2B, which show the structure of a typical prior art electronic stimulus collar 1. Electronic stimulus collar 1 includes a receiver unit 2, which may include conventional radio frequency receiver circuitry to receive RF signals from a remote transmitter device via the illustrated antenna. Receiver unit 2 also may include circuitry for decoding the demodulated RF signal to control stimulus generating circuitry. For a "bark control" collar, receiver unit 2 may receive audio or vibration signals from a microphone or transducer attached or connected to the receiver unit 2 or the collar. In any event, circuitry included in receiver unit 2 produces an appropriate electrical stimulus by means of a pair of spaced electrodes 6 and 7, which may be attached directly to the housing of receiver unit 2 as shown in FIG. 2, or may be attached to the inside surface of collar 10 and electrically connected to the circuitry in receiver unit 2 by means of insulated high voltage wires running along or within collar strap 10 to the secondary terminals of an output transformer or other circuitry or means for generating high voltages within receiver unit 2.

The level of stimulus produced between electrodes 6 and 7 while they are making effective electrical contact to the skin of the dog needs to be selected to suitably match the present sensitivity of the dog and the present type of training (eg., learning, motivational, or aversive training).

To achieve such matching, electronic stimulus collar 1 of FIG. 2 also includes a pair of banana plug jacks 11 and 12, into which a plug-in resistor element 14 is plugged, shown in FIG. 2A. Plug-in resistor element 24 includes two gold plated banana plugs 15 and 16 which are inserted into and make reliable electrical contact with gold plated conductors of jacks 11 and 12. Typically, Tri-Tronics electronic stimulus collars have been sold with a kit of five such plug-in resistor elements, with suitable values of resistance 17 being connected between banana plugs 15 and 16 when plug-in resistor element 14 is plugged into jacks 11 and 12. The resistance 17 is thereby connected in series between one of the terminals of a secondary winding of an output transformer in receiver unit 2 and one of the electrodes 6 or 7. Typically, the five plug-in resistor elements 14 may have values of resistance 17 of one megohm, 330 kilohms, 100 kilohms, 33 kilohms, and zero ohms.

When electrodes 6 and 7 then make electrical contact to the dog's skin (by virtue of both the high open circuit transformer output voltage between them and their close proximity and/or physical contact with the skin), a voltage generally proportional to resistance 17 is developed across resistance 17. This regulates current flow (which constitutes the desired electrical stimulus) through the dog's skin between the two points at which probes 6 and 7 electrically contact the skin. For plug in resistor elements with non-zero resistance, the magnitude of the current, and hence the level of the electrical stimulus, is limited by the selected value of the resistance 17. In any case, the electrical stimulus is applied to the skin of the dog between the two electrodes 6 and 7. If a zero resistance plug-in element 14 is plugged into jacks 11 and 12, nearly all of the energy produced by the output transformer is applied as a stimulus to the skin of the dog. Thus, by selecting the plug-in element with an appropriate resistance value, a suitable level of stimulus intensity will be applied to the dog's skin.

It is well known that the degree of electrical stimulation which is most effective in a particular training situation is dependent upon the attentiveness of the dog to the trainer. Ordinarily, relatively low levels of electrical stimulation selected by the trainer in accordance with good dog training practice are very effective in accomplishing desired training goals. However, if the dog is distracted, for example, by a rabbit or cat running nearby, a much higher degree of electrical stimulation may be required to achieve an appropriate response by the dog. But, it also is known that an inappropriately excessive stimulus may confuse the dog.

Failure to deliver appropriate stimulus at precisely the correct time in a dog training situation can result in a confused, poorly trained animal, and in fact often reverses previous training accomplishments. Consequently, the reliability of "delivering" the intended electrical stimulus level to the skin of the dog under a wide variety of conditions (eg., of collar tightness, thickness and wetness of fur, general sensitivity of the particular dog to electrical stimulus, and the presence of distracting influences or occurrences) is quite critical to the overall effectiveness of electronic stimulus collars and the associated training techniques.

Electronic stimulus collars of the type shown in FIG. 2, sold with plug-in series resistive elements to control the level of electrical stimulation applied to the dog, have been quite effective and are widely used by trainers. However, the physical size and weight of some known electronic stimulus collars, for example, Tri-Tronics' models 100, 200 and 500, is such that they are too large and heavy for smaller dogs (for example, a toy poodle). Nevertheless, such smaller dogs also could benefit greatly from aversive or motivational stimulus training techniques using electronic stimulus collars. Also, the cost of suitable plug-in elements 14 as a method of varying stimulation intensity is comparatively high.

Furthermore, plug-in resistor elements 14 are physically large, and this requires the physical size of the receiver unit 2 to be larger than desirable in order to accommodate the necessary jacks. Also, such plug-in resistor elements 14 occasionally become snagged by brush, dislodged, and lost as the dog runs through the brush. Professional trainers may have to frequently remove and insert various plug-in resistor elements 14 when training a large number of dogs using only one electronic stimulus collar. This wears through the gold plating on the banana plugs and weakens spring elements of the banana plugs. Consequently, electrical contact becomes unreliable and stimulus delivery may become sporadic, thereby necessitating the inconvenience and cost of purchasing replacement plug-in elements 14.

A typical prior art training procedure using a remote transmitter of the type which can apply three remotely selectable levels of stimulus by depressing buttons to produce stimulation pulses at different pulse rates is described next. For a particular dog on which an electronic stimulus collar is being used for the first time, the highest resistance plug-in element 14 is plugged into banana plug jacks 11 and 12. The lowest level button on the transmitter unit is actuated so that the lowest level stimulation signal is applied to the neck of the dog. If the dog does not appear to have noticed the stimulation (for example, the dog does not change head position or ear posture, cock its head, or exhibit an involuntary muscle twitch), a higher stimulation level is selected by removing the present plug-in element 14 and replacing it by the next lower resistance value plug-in element. The above process is repeated until a "threshold" stimulus level is established for that dog, as evidenced by one of the above reactions. With the installed plug-in element selected in this manner, training of the dog can proceed. Stimulus intensity thereafter is varied in noticeable increments by depressing the various intensity controls on the remote transmitter. The foregoing procedure thus establishes a threshold stimulus level which can result in very effective "motivational" stimulus training for a particular dog. After the dog has become accustomed to the electronic stimulus collar, other plug-in resistor elements 24 which allow higher levels of stimulus to be applied then can be used effectively. Higher levels of stimulus can be used for motivational training or for aversive training to deter the dog from continuing an undesirable behavior.

As indicated above, it is well known that unreliable operation of electronic stimulus collars can "undo" previous accomplishments in the training effort. Furthermore, if the equipment fails to deliver a strong aversive stimulus when the dog embarks upon action which he previously has been trained to avoid, an effective training opportunity would be lost.

The opposite situation also can occur if the dog accidentally receives an extremely high intensity of stimulus at a time when it is not intended. For example, if it is raining or if the dog has recently jumped into a pond so that moisture has "shunted" or partially short-circuited a 1 megohm resistance 17 in a plug-in resistive element 14, and the dog then begins creeping forward when he is "on point" (i.e., standing motionless upon detecting the scent of a game bird), and if the trainer then applies what is intended to be a gentle stimulus to remind the dog to not creep forward, a very excessive stimulus may be applied to dog as a result of such shunting. The dog then is likely to associate the scent of the game bird with the excessive stimulus, making it very difficult for the dog to exhibit the desired instinctive pointing behavior in the future.

Thus, various conditions are known to cause inconsistent application of the desired stimulus to the dog. Most of the conditions which result in such inconsistent application of electrical stimulus to the skin of the dog are directly related to how consistently the levels of desired stimulus current are applied by electrodes 6 and 7 to the dog's skin under a variety of conditions, ranging from loose collars and short, dry fur or dry skin to long, shaggy, wet, conductive fur or wet skin.

Despite many years of effort and advancement in the area of effectively applying the stimulus produced between the output terminals of the secondary winding of the output transformer of the receiver unit to the skin of the dog, there still remains an unmet need for a simple, more compact, effective, inexpensive, and especially a more consistent way of delivering a desired level of electrical stimulus to the animal being trained.

SUMMARY OF THE INVENTION

Accordingly, it is an object of the invention to provide an improved electrode structure for an electronic stimulus device which improves the consistency with which a desired level or degree of stimulus is applied to the animal under a wide variety of conditions.

It is another object of the invention to provide an economical means of reliably selecting an intensity level of stimulation while maintaining high levels of open circuit voltage at the electrode tips under a wide variety of conditions without using plug-in resistive elements or associated jacks and internal connections thereto.

It is another object of the invention to provide an electrode structure which facilitates use of small size, lightweight electronic stimulus devices.

It is another object of the invention to provide an electrode structure which avoids the previously described difficulties associated with the use of plug-in intensity-setting elements in electronic dog collars.

It is another object of the invention to provide an electrode structure which allows an electronic collar unit having a high open circuit voltage and selectable intensity levels to be small enough for effective use with "small dogs" (for example, smaller than an average beagle).

It is another object of the invention to provide an electrode structure which increases the range with which remote transmitters can be utilized to control the stimulus applied via the electrodes.

It is another object of the invention to avoid unintentional excessive stimulus from being applied to an animal.

It is another object of the invention to avoid unreliable operation of electronic stimulus collars as a result of internal arcing and/or corona effects.

It is another object of the invention to avoid the likelihood of dislodging plug-in series resistive elements of an electronic stimulus collar as the animal runs through brush or the like.

It is another object of the invention to avoid reverses in the effectiveness of animal training as a result of inconsistent delivery of the desired level of stimulus to the animal, either in the form of under-stimulus or over-stimulus.

It is another object of the invention to reduce the cost of manufacturing reliable, small sized .electronic stimulus collars.

It is another object of the invention to reduce the component cost and complexity of reliable electronic stimulus collars.

Briefly described, and in accordance with one embodiment thereof, the invention provides a resistive electrode structure adapted for connection to an electronic stimulus device. The resistive electrode structure includes a base having a portion adapted for removable attachment to a mounting element of the electronic stimulus device. An electrode of the resistive electrode structure includes a tip adapted to supply electrical stimulus to the skin of an animal. Resistive material is electrically connected between the electrode and a conducting element. An insulative housing encloses the resistive material and supports the electrode and the conducting element.

In one described embodiment, the conducting element is the base, and the base includes a threaded stud and the mounting element includes a threaded hole that mates with the threaded stud. The insulative housing includes a portion in the shape of a nut to effectuate tightening the resistive electrode structure onto the mounting element. A cylindrical portion of the base is enclosed by the insulative housing, and a cylindrical portion of the electrode also is enclosed by the insulative housing. The cylindrical portions include knurled surfaces to increase mechanical bonding and hermetic sealing between the insulative housing, the base, and the electrode element. In one described embodiment, the resistive material includes a carbon composition resistor having first and second axial leads. The base includes a first hole into which the first lead extends, and the electrode includes a second hole into which the second lead extends. The first and second leads are tinned to produce good interference fitting with the first and second holes, respectively. The insulative housing is composed of injection molded plastic material. The mounting element is connected by solder to an exposed end of a secondary winding of an output transformer of a receiver unit of the electronic stimulus collar. Insulative epoxy material is disposed around the solder connection, to avoid arcing or corona within the receiver unit.

BRIEF DESCRIPTION OF THE DRAWINGS

FIG. 1 is a partial cutaway elevational view of a resistive electrode structure according to the present invention.

FIG. 1A is a left elevational end view of the resistive electrode structure shown in FIG. 1.

FIG. 1B is a side elevational view of the resistive element contained within the resistive electrode structure of FIG. 1.

FIG. 1C is a schematic diagram illustrating direct connection of the terminals of the output transformer of an electronic stimulus collar receiver unit to two electrode structure.

FIG. 2 is a perspective view of a prior art electronic stimulus collar.

FIG. 2A is a schematic diagram illustrating plug-in resistive elements used to select the intensity of stimulus applied between the electrodes of the electronic stimulus collar of FIG. 2.

FIG. 2B is a bottom view of a plug-in resistive element as shown in FIG. 2A.

FIG. 3 is a plan view of an alternative embodiment of the invention.

FIG. 4 is a diagram illustrating routing and insulation of high voltage wires coupling the terminals of the secondary winding of the receiver of an electronic stimulus collar to the electrode structure thereof.

FIG. 5 is a perspective view of an electronic stimulus collar with electrode structure mounted on the inner surface of the collar and connected by insulated high voltage wires to the receiver.

DETAILED DESCRIPTION OF THE PREFERRED EMBODIMENTS

Referring to FIG. 1, the resistive electrode structure 19 of the present invention has external appearance and dimensions similar to those disclosed in the assignee's above-mentioned U.S. Pat. Nos. 5,099,797 and 5,193,484. Resistive electrode structure 19 includes an insulative housing 21 including a hexagonal nut-shaped base portion 21B and a generally cylindrical or frustoconical shank portion 21A. Insulative body 21 preferably is composed of ABS plastic material.

Figure 4A:
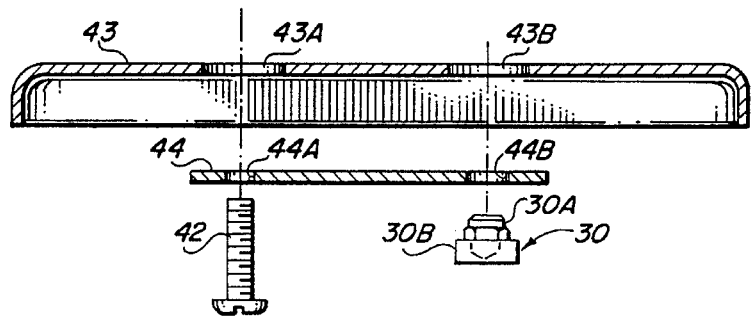
FIG. 4A is a section view along section lines 4A—4A of FIG. 4.

A metal base section 23 of resistive electrode structure 19, preferably composed of nickel plated steel material, extends into a recess 21C in the flat base surface 21D of resistive electrode 19. A threaded stud 23A integral with base section 23 can be screwed into a threaded hole 31 of a mounting element 30 installed in and electrically insulated from the cover 43 of the receiver of an electronic stimulus collar, as shown in FIGS. 4 and 4A. Numeral 22 indicates an optional O-ring which can be placed around threaded stud 23A to prevent an external current shunting path from the threaded stud 23A to the exposed portion of subsequently described electrode 27.

A cylindrical portion 23B of base section 23 fits tightly into recess 21C of insulative housing 21. Cylindrical portion 23B has therein a precision cylindrical hole 23D extending along the longitudinal axis of threaded stud 23A. Numeral 23C indicates a knurled outer surface of cylindrical portion 23B which ensures strong mechanical attachment and hermetic sealing of insulative housing 21 to metal base 23, as a result of an injection molding process utilized to form insulative housing 21.

A resistive element 25, which Can be an ordinary inexpensive one fourth watt carbon composition resistor, is located within insulative housing 21, with its axial lead 25A extending into cylindrical hole 23D. Preferably, hole 23D is first drilled, and then reamed by a machining operation to provide a very precise tolerance of its internal diameter. Leads 25A and 25B of resistor 25 preferably are tinned, resulting in a good interference fit and reliable electrical connection between axial lead 25A and metal base 23 and between axial lead 25B and cylindrical electrode 27.

Cylindrical electrode 27 is disposed in a recess 21E at the outer end of frustoconical portion 21A of insulative housing 21. Electrode 27 has a hemispherical outer tip 27A as shown in FIG. 1. Electrode 27, preferably composed of stainless steel material, has a precision hole 27B for receiving axial lead 25B of resistor 25. The outer cylindrical surface portion 27C of electrode 27 is knurled to improve mechanical engagement and hermetic sealing with insulative housing 21.

Preferably, resistive electrode structure 19 is manufactured by first assembling base section 23, carbon composition resistor 25, and electrode 27. To accomplish this, tinned axial leads 25A and 25B of resistor 25 are inserted into precision holes 23D and 27B, respectively, in each case producing a solderless interference fit which ensures reliable electrical contact. As indicated in FIG. 1, the edges of holes 23D and 27B are tapered, to allow easier positioning of the ends of leads 25A and 25B into such holes during assembly. The plastic material that forms insulative housing 21 then is injection molded around the assembly 23,25,27 to form the completed resistive electrode structure 19. Carbon composition resistor 25 can have various suitable values for establishing various substantially different stimulation levels; for example, values of one megohm, 330 kilohms, 100 kilohms, and 33 kilohms can be used in one of the preferred embodiments of the invention. Carbon composition resistor 25 can be replaced by a conductor to provide a resistance of zero ohms.

Injection molded insulative housing 21 thus provides a very rigid, hermetically sealed structure which prevents moisture from reaching any portion of resistor 25. This greatly increases the "effective" maximum voltage or "flashover" voltage of carbon composition resistor 25, from a rated value of roughly 250 to 500 volts to a value exceeding 6,000 volts (which is the maximum open circuit voltage typically produced by the output transformer in the receiver unit of an electronic stimulus collar manufactured by the present assignee). The hermetic encapsulation of the inexpensive one fourth watt carbon composition resistors provides a low cost structure that avoids any likelihood of resistor 25 becoming shunted (i.e., partially short-circuited) by moisture when the dog's fur becomes wet. This avoids applying excessive stimulus from the output transformer to the dog's skin as a result of the unintentional shunting of the resistive element when only a mild stimulus is intended.

FIG. 1C schematically illustrates a receiver unit 28 of an electronic stimulus collar, which is supported by its strap 40. The resistive electrode structure 19 of FIG. 1 is threaded into the above mentioned mounting base 30, which is installed in and insulated from lid 43 (FIGS. 4 and 4A) of anodized aluminum housing 28A of receiver unit 28. The conductor 33A of an insulated secondary winding lead of output transformer 32 (FIG. 1C) is soldered to the metal base 30B (FIG. 1) of mounting base 30. This solder connection (30C in FIGS. 1C and 4) is covered with insulative epoxy 49 to prevent shorting, arcing or corona. Knurled surface 30D of section 30A provides good mechanical connection to epoxy 49. Alternatively, mounting base 30 can be supported by strap 40 remotely from housing 28A, as shown in FIG. 5. As shown in FIG. 1C, a standard non-resistive electrode structure 36 (which can be similar to or identical to those disclosed in above mentioned U.S. Pat. No. 5,193,484) is connected to a second conductive mounting base 34, which is connected by means of connection 34C to an insulated second lead wire 33B of secondary winding 33. A primary winding 29 of output transformer 32 is connected to the output of receiver unit circuitry 38.

Receiver unit circuitry 38 can be similar or identical to receiver circuitry included in various products marketed by the present assignee, including Tri-Tronics models No. 100, 200, 300 and 500, or any other circuitry that receives a control signal, either from a remote transmitter or an acoustic transducer located on the receiver unit to detect vibrations caused by the onset of barking. Receiver unit circuitry 38 can include a frequency programmable oscillator to produce different stimulation repetition rates, or a microprocessor in or coupled to receiver circuitry 38 can be programmed to receive control signals produced in response to signals received from a remote transmitter or an acoustic transducer mounted on the collar.

It should be recognized that a threaded stud (such as screw 42 in FIG. 4A) can be provided as a mounting base and connected to a secondary winding lead for mating with a threaded hole 46 which can be provided within the metal base 23 of a resistive electrode structure 19A, as shown in FIG. 3.

The present invention was developed as a result of the applicants' continuing and growing recognition of the above mentioned difficulties associated with the prior art, including the problems of inconsistent application of the desired electrical stimulus level to the dog being trained, the excessive size and weight of electronic stimulus collars having a wide range of selectable stimulus levels (making them unsatisfactory for smaller dogs), high costs associated with plug-in resistive elements and their jacks and interconnections, and the need for occasional or frequent replacement of plug-in resistive elements which sometimes are dislodged as the dog runs through brush or which experience unreliable contact due to wear caused by frequent insertion and removal of the gold plated banana plugs or the retention of dirt or debris at the interface between the jack and banana plug.

From the viewpoint of minimizing manufacturing costs while ensuring reliable electrical contact between leads 25A and 25B of resistor 25, base 23, and electrode 27, respectively, it is preferable (especially if electrode 27 is stainless steel) that solderless connections be utilized. From the viewpoint of obtaining an inexpensive hermetic seal which prevents resistor 25 from ever being exposed to moisture, it is preferable that the insulative housing 21 be injection molded over the assembly 23,25,27. However, it should be appreciated that, with suitable choice of materials, the leads of resistor 25 can be soldered to base 23 and electrode 27. Alternatively, leadless resistors could be suitably connected to base 23 and electrode 27 so as to provide reliable electrical connection, by soldering or other means. It might even be possible to use conductive epoxy or plastic molding material that extends between the inner surfaces of base 23 and electrode 27 in order to form a resistor 25.

The applicants have long recognized that under certain conditions RF communication between the remote transmitter and the electronic stimulus collar receiver unit can be momentarily interrupted. This is especially true when the animal is nearly out of range of the transmitter unit, in which case the orientation of the dog or the presence of physical barriers may prevent a signal from the transmitter unit from being accurately received and converted by the receiver unit into a suitable training stimulus. The exact cause of such interruptions is rarely known with any reasonable degree of certainty, but may be aggravated by generation of RF interference in the receiver unit due to arcing or corona.

Recently, however, the applicants have become aware of some evidence (not yet conclusive) that use of the above resistive electrode 19 (instead of the prior plug-in resistive elements) to establish a base stimulation level for a particular dog seems to result in increased range and improved reliability of applying the intended stimulus to the neck of the dog. This unexpected benefit has led to the consideration of the possibility that substantial internal arcing or corona occurs within the receiver unit, thereby impairing communication between the transmitter and receiver units. This may have caused many unexplained instances in which the intended stimulation was not applied to the dog's skin.

The use of the resistive electrode 19 (as shown in FIG. 1C) allows the insulated wire which constitutes secondary winding 33 of the output transformer to be connected directly to the mounting bases of both resistive electrode 19 and standard conductive electrode 36, eliminating connections between insulative conductor 33A and a female banana plug connector required when plug-in resistive elements such as 14 are used. In the past, small rubber or plastic sleeves were utilized to insulate and avoid arcing or corona at connections of the secondary winding leads and banana jacks. However, it now appears that avoidance of arcing or corona at such connections was not adequately achieved.

Furthermore, the banana jacks extending into the receiver unit housing 28A may have produced other corona or arcing sites close enough to sensitive components of the RF receiver circuitry to reduce effectiveness thereof. It is well known that corona or arcing can produce broadband noise of sufficient magnitude to interfere with sensitive RF receiver circuitry. It is believed that the above mentioned corona can mask an incoming signal from the remote transmitter, producing an undesired termination of the stimulus signal for devices in which the duration of the stimulus is determined by the duration of the transmitter signal. Furthermore, the portions of the banana jacks inside electronic stimulus collars for receiving plug-in resistive elements inherently require a considerable amount of space, which is inconsistent with making electronic stimulus collars small enough to be easily carried by smaller dogs, such as cocker spaniels.

Figure 6:
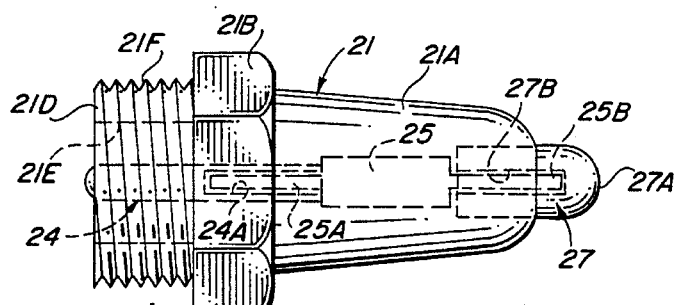
FIG. 6 is an elevational view of an alternative embodiment of the invention.

An alternative mounting element 21D for an electrode structure 19B of the present invention is shown in FIG. 6. Mounting element 21D is formed as an integral part of the ABS plastic insulative housing structure 21 that includes frustoconical portion 21A, hexagonal nut-shaped base portion 21B, and a cylindrical base or stud portion 21D with a threaded surface 21F and a cylindrical hole 21E therein. Resistor 25 and electrode 27 are the same as in FIG. 1.

In electrode structure 19B, insulative housing 21 supports conductive electrical contact pin 24 in coaxial alignment with cylindrical hole 21E and resistor 25. Axial lead 25A of resistor 25 extends into hole 24A of the right end of contact pin 24, preferably in a solderless interference fit. The left end of contact pin 24 is inserted into a female conductive element of a mating mounting element (not shown) of the electronic stimulus collar as threads 21F are threaded into such mounting element. Alternatively, the protruding lead 25A of resistive element 25 could function as the contact pin. Thus, electrical connection to a terminal of the secondary winding of the output transformer is made separately from the mechanical mounting.

Figure 8:
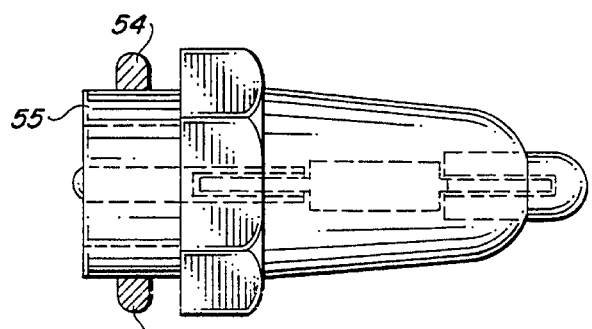
FIG. 8 is an elevational view of another alternative embodiment of the invention including a quick-connect feature.

Connective elements other than the threaded shank 21D shown in FIG. 6 can be devised, either as part of the insulative housing 21 or as enjoined separate metallic parts. For example, various "quick connect" mounting structures, such as the "bayonet" connector with protrusions 54 for engaging a suitable mounting base (not shown) extending from shank 55 as shown in FIG. 8, can be used instead of threaded shank 21D.

Figure 7:
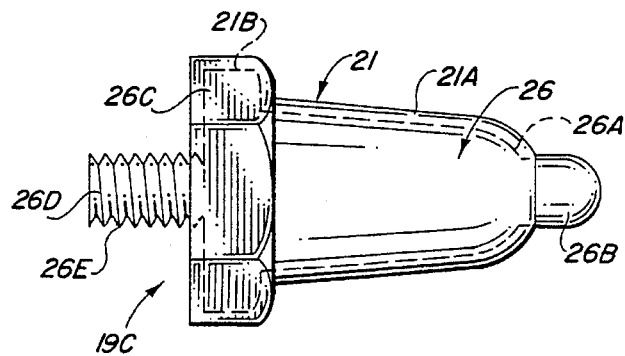
FIG. 7 is an elevational view of another alternative embodiment of the invention.

The electrode structure 19C of FIG. 7 does not utilize metallic parts for the electrode or the base. Instead, the resistive element 26A, electrode 26B, and threaded mounting base/electrical connection 26D all are formed as part of a section 26 of suitable resistivity (or conductivity) material. Such material can be doped plastic, ceramic, or semiconductor material. The conductivity of section 26 can be selected by providing electrode structures with various values of resistance between base 26D and electrode 26B (for example, the resistance values mentioned with reference to FIG. 1). Alternatively, the resistance between threaded base 26D and electrode 26B can be controlled by changing the internal cross section shape and/or size of the conductive material constituting section 26A between electrode 26B and threaded base 26D so as to provide the desired resistance using material of constant resistivity. All exterior surfaces of unit 26, except electrode 26B and mounting base 26D, are enclosed within injection molded insulative covering 21A, 21B to prevent unwanted shunting resistive paths, as explained previously. Other similar structures might include only a metallic electrode or only a metallic base while retaining the other features of FIG. 7.

It should be noted that the term "skin" as used herein is meant to include any externally accessible skin tissue or membrane, including the skin or membrane lining of the mouth or any other external body orifice of an animal.

It also should be noted that the terms "electronic stimulus device" and "electronic stimulus collar" as used herein are intended to include any straps or harnesses or the like that are associated with such electronic stimulus device or collar.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, the electrode could be attached to stimulus devices other than electronic stimulus collars.

What is claimed is:

1. A resistive electrode structure adapted for connection to an electronic stimulus device adapted to be mounted on a portion of an animal's body, comprising in combination:

(a) a conductive base having a portion adapted for attachment to a conductive mounting element of the electronic stimulus device;

(b) a conductive electrode having a tip adapted to supply electrical stimulus to skin of an animal;

(c) a resistive element electrically connected between the conductive base and the conductive electrode; and (d) an insulative housing enclosing the resistive element and rigidly supporting the conductive electrode and the conductive base.

2. The resistive electrode structure of claim 1 wherein one of the conductive base and the conductive mounting element includes a threaded stud and the other includes a threaded hole that mates with the threaded stud.

3. The resistive electrode structure of claim 2 wherein the insulative housing includes a base portion in the shape of a nut to effectuate turning the resistive electrode structure to tighten threaded attachment thereof onto the conductive mounting element.

4. The resistive electrode structure of claim 3 wherein the threaded stud is integral with the conductive base.

5. The resistive electrode structure of claim 3 wherein a cylindrical portion of the conductive base is enclosed by the insulative housing and a cylindrical portion of the conductive electrode is enclosed by the insulative housing, the cylindrical portions including knurled surfaces to increase mechanical bonding and hermetic sealing between the insulative housing, the conductive base, and the conductive electrode.

6. The resistive element of claim 5 wherein the insulative housing is composed of injection molded plastic material.

7. The resistive electrode structure of claim 5 wherein the insulative housing is composed, of ABS plastic material.

8. The resistive electrode structure of claim 5 wherein the conductive base is composed of nickel plated steel and the conductive electrode is composed of stainless steel.

9. The resistive electrode structure of claim 1 wherein the resistive element includes a resistor having first and second leads, the conductive base includes a first hole into which the first lead extends and the conductive electrode element includes a second hole into which the second lead extends.

10. The resistive electrode structure of claim 9 wherein the first and second leads are tinned and produce interference fitting with the first and second holes, respectively.

11. The resistive electrode structure of claim 10 wherein the resistor is a carbon composition resistor and the first and second leads are axial leads.

12. The resistive electrode structure of claim 1 wherein the mounting element is connected by solder to an exposed end of an insulated wire integral with a secondary winding of an output transformer of a receiver unit of the electronic stimulus device.

13. The resistive electrode structure of claim 12 including insulative material disposed around the solder connection to avoid arcing or corona adversely affecting operation of the receiver unit.

14. The resistive electrode structure of claim 1 wherein a tip of the conductive electrode is generally hemispherical.

15. A resistive electrode structure, adapted for connection to an electronic stimulus device, and adapted to be held against a portion of an animal's body, comprising in combination:

(a) a base having a portion adapted for removable attachment of the resistive electrode structure to a mounting element associated with the electronic stimulus device;

(b) an electrode having a tip adapted to supply electrical stimulus to skin of the animal;

(c) a conducting element adapted to be electrically connected to an output terminal of the electronic stimulus device;

(d) resistive material electrically connected between the conducting element and the electrode; and (e) an insulative housing containing the resistive material and supporting the electrode and the conducting element.

16. The resistive electrode structure of claim 15 wherein the conducting element constitutes the base.

17. The resistive electrode structure of claim 16 wherein one of the conducting element and the mounting element includes a threaded stud and the other includes a threaded hole that mates with the threaded stud.

18. The resistive electrode structure of claim 15 wherein the insulative housing seals the resistive material from moisture to prevent shunting of current around the resistive material.

19. The resistive electrode structure of claim 15 wherein the base includes a first quick-connect feature adapted to accomplish quick operable connection and quick disconnection of the resistive electrode structure from the mounting element.

20. A method of changing the stimulus level supplied by an electronic stimulus device to the skin of an animal and maintaining a resulting changed stimulus level at a constant value, comprising the steps of:

(a) simultaneously electrically and mechanically disconnecting a first integral resistive electrode structure having a first resistance from a connecting element associated with the electronic stimulus device;

(b) simultaneously electrically and mechanically connecting a second integral resistive electrode structure to the connecting element; and (c) maintaining the resulting changed stimulus level at the constant value by providing an insulative housing that surrounds resistive material within the second integral resistive electrode structure to prevent moisture from shunting current around the resistive material.

21. The method of claim 20 including connecting a high voltage output conductor of the electronic stimulus device directly to the connecting element and providing electrical insulation material around a resulting connection to avoid arcing or corona at the connection.

* * * * *